March 5, 1946.　　　　E. BOSSI　　　　2,396,038
HELICOPTER
Filed May 28, 1942　　　　4 Sheets-Sheet 1
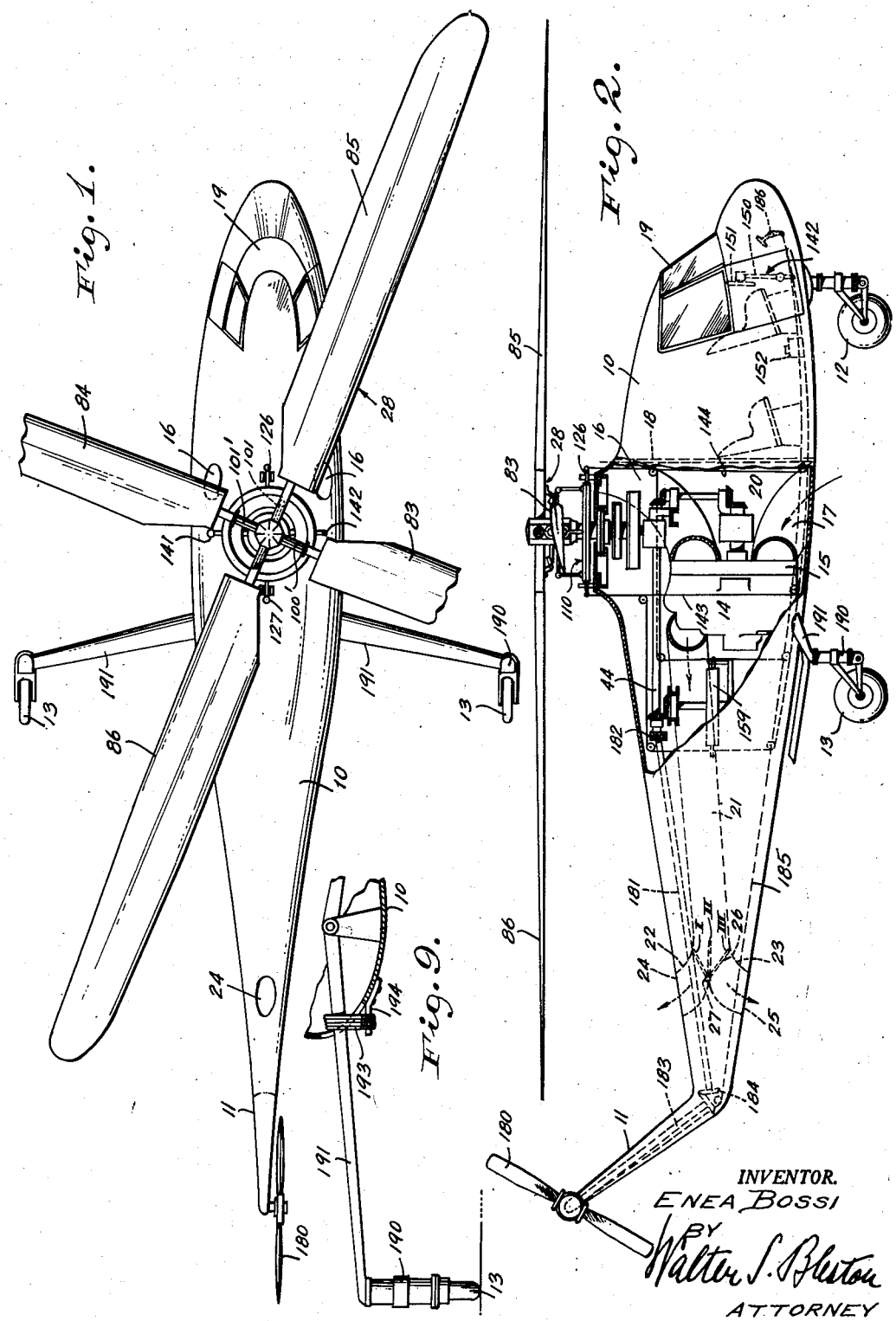
INVENTOR.
ENEA BOSSI
BY
Walter S. Bleston
ATTORNEY March 5, 1946.  E. BOSSI  2,396,038
HELICOPTER
Filed May 28, 1942   4 Sheets-Sheet 2
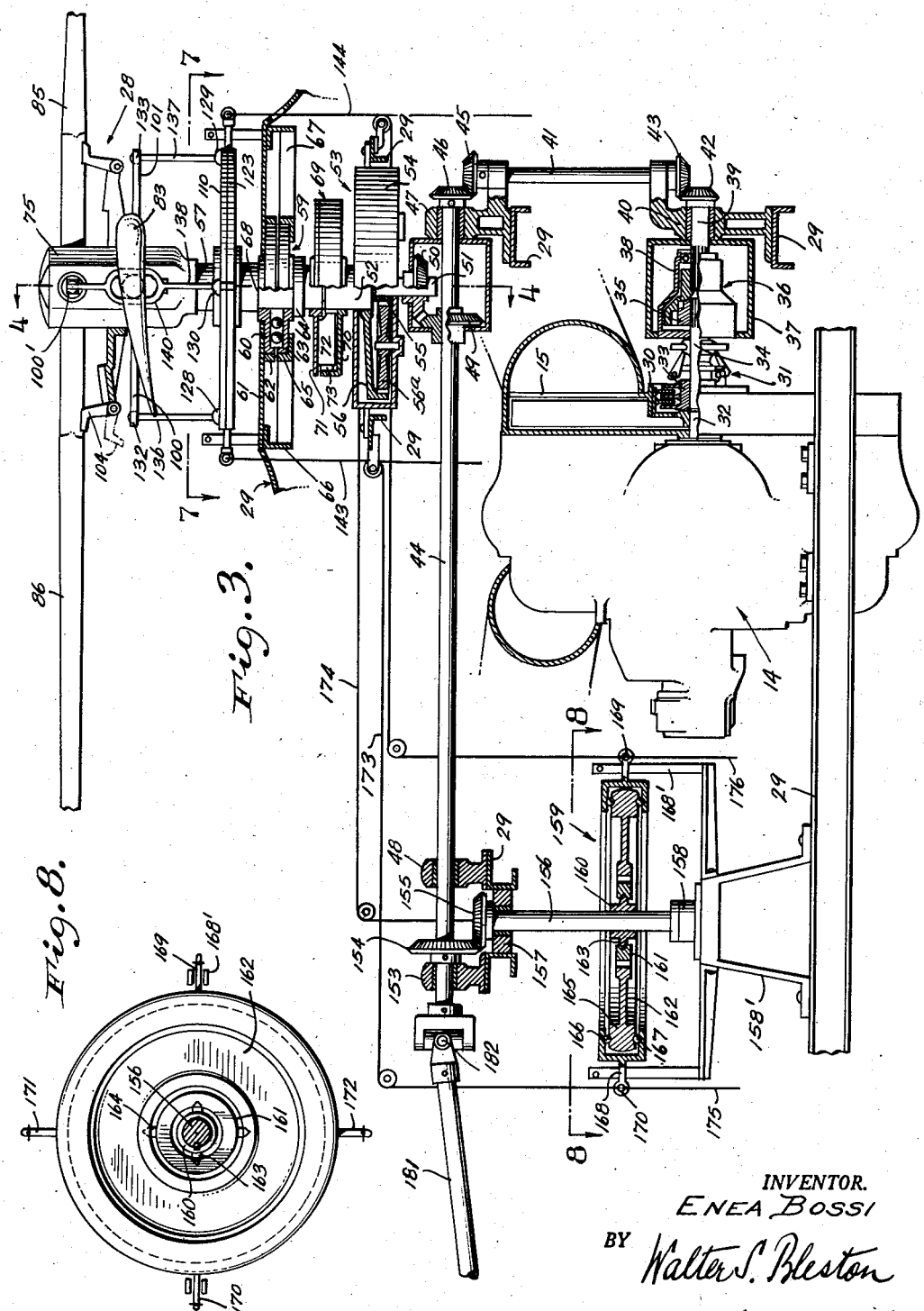
INVENTOR.
ENEA BOSSI
BY Walter S. Bleston
ATTORNEY March 5, 1946.  E. BOSSI  2,396,038
HELICOPTER
Filed May 28, 1942  4 Sheets-Sheet 3

INVENTOR.
ENEA BOSSI
BY Walter S. Bleston
ATTORNEY

March 5, 1946.  E. BOSSI  2,396,038
HELICOPTER
Filed May 28, 1942   4 Sheets-Sheet 4

INVENTOR.
ENEA BOSSI
BY Walter S. Pleston
ATTORNEY

Patented Mar. 5, 1946

2,396,038

UNITED STATES PATENT OFFICE 2,396,038

HELICOPTER

Enea Bossi, New York, N. Y.

Application May 28, 1942, Serial No. 444,799

8 Claims. (Cl. 244—17)

The present invention relates to an aircraft of the helicopter type. General requirements of an aircraft are controllability, safety and a high degree of efficiency. The fact that helicopters are not yet practically used seems to indicate that the hitherto built experimental helicopters were not capable of fulfilling these three requirements at the same time. Serious vibrations occurring for various reasons and lack of sufficient stability were additional drawbacks of such experimental machines. The present invention contemplates, therefore, to provide a helicopter which is useful for practical purposes, that is to say, which complies with the mentioned requirements in a satisfactory manner, and which is reasonably free from vibrations and sufficiently stable under all conditions of operation.

The lifting power for the vertical rising of a helicopter is obtained by a large diameter air screw or rotor whose blades rotate in a horizontal plane without changing the pitch or angle of incidence during the course of a revolution. Translatory movement can be obtained by either tilting the plane of rotation or by "feathering" the rotor blades. As a result of either measure, the angle of incidence of each blade will be progressively changed during each revolution from a minimum to a maximum and back to the minimum wherein each of the periods of increasing and decreasing angle of incidence corresponds to an angle of 180° of the rotor rotation. The helicopter will then have a horizontal component of movement in a direction 90° forward of that radius of the rotor circle on which each blade has its minimum angle of incidence, and the quantity of the horizontal component will be a function of the difference between the maximum and the minimum. This is well known in the art and described more fully, e. g. in U. S. Patent No. 2,256,918 of September 23, 1941. Hence, by selecting the radius on which such minimum occurs, the helicopter can be controlled so as to move forward or backward or to port or starboard, according to the pilot's desire. For reasons which need not be explained in this place, "feathering" of the blades is preferable to the actual tilting of the rotor. This "feathering" is accomplished by turning each blade a desired angle, back and forth, about the longitudinal blade axis. Constructions are known in the art to effect feathering of two-bladed rotors under the pilot's control. However, two-bladed rotors are not satisfactory in helicopters, because of the occurring vibrations. Such vibrations decrease only with an increase of the number of blades. Furthermore, rotors with only two blades have been found insufficient to furnish the air-resistance required to carry the helicopter safely downward when the driving power of the motor is cut off. Both these reasons call for a rotor with a higher number of blades. Nevertheless, not even four-bladed rotors with feathering mechanism appear to be in use, presumably because the mechanism useful in a two-bladed rotor cannot be merely doubled without arriving at inadmissible bulkiness and weight. A rotor of such type in which all four blades would have to rotate in the same directions must not be confused with the well-known arrangement of two co-axial rotors, one above the other revolving in opposite directions. This latter construction has been found objectionable because of the very great danger of the blades of the two rotors interfering and thus causing the destruction of the rotor when a landing shock occurs whereby the tips of the blades of the one rotor owing to their flexibility or resiliency, spring into the plane of the blades of the other one. Hence it is another object of the invention to provide a feathering-controlled rotor of satisfactory design with a plurality of pairs of blades and in which each pair of blades in addition to the feathering is also capable of rocking about an axis at right angles to the plane defined by the axis of rotation and the longitudinal blade axis in order to counteract occurring forces which may tend to tilt the machine. The invention also contemplates to provide automatic locking means to prevent the rotor blades from rocking when the rotor is at a standstill or rotating with a speed below a predetermined minimum.

Further objects and details of the invention will be apparent from the description given hereinafter and the accompanying drawings illustrating an embodiment thereof by way of example. In the drawings:

Fig. 1 is a top plan view of a helicopter according to my invention;

Fig. 2 is a side elevation, partly in section, of the embodiment of Fig. 1;

Fig. 3 is a side elevation partly in section of the driving elements thereof at a larger scale;

Fig. 8 is a cross-section along line 8—8 in Fig. 3,

Fig. 9 is a detail section of the landing gear.

Figure 4:
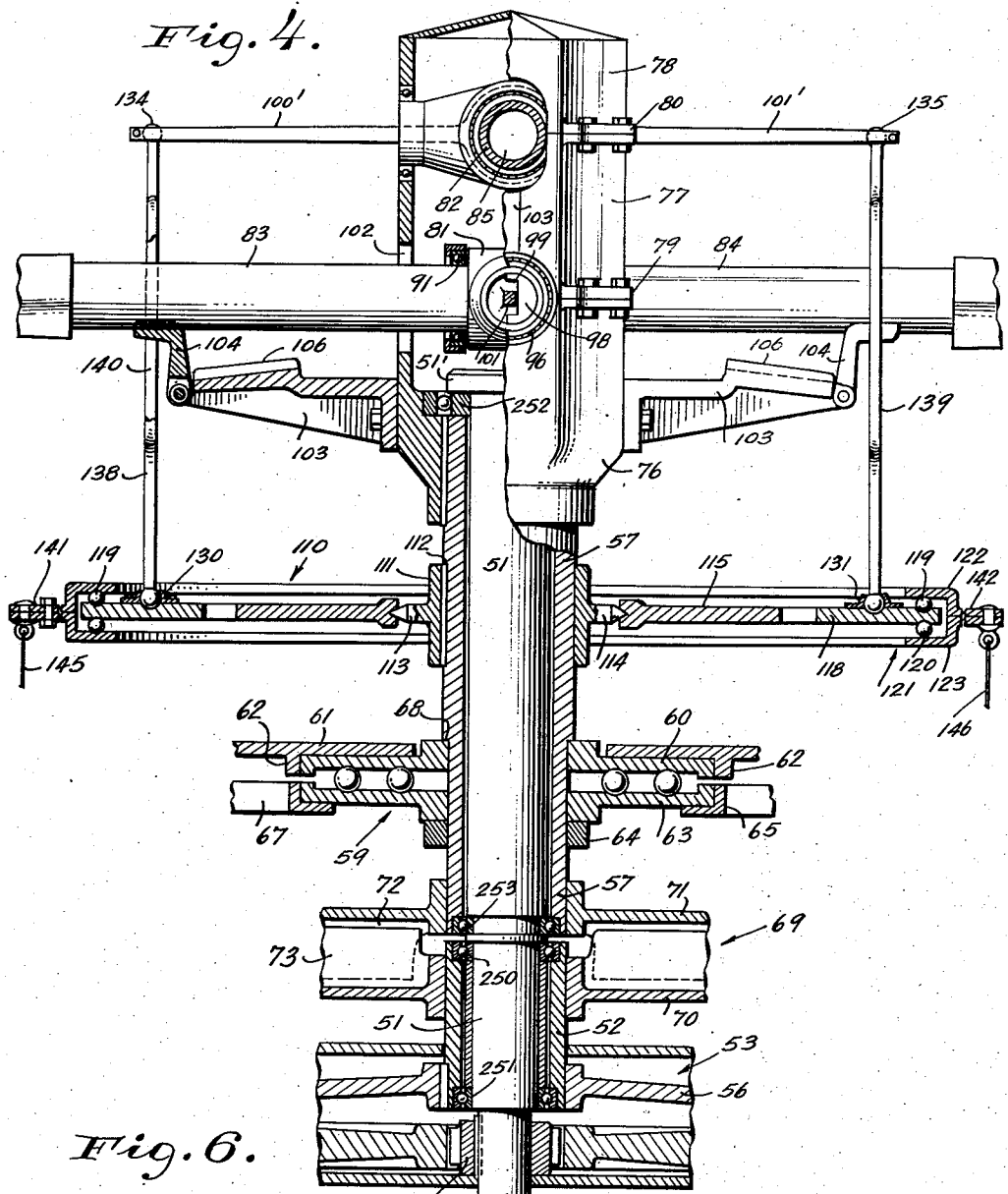
Fig. 4 is a section along line 4—4 of Fig. 3 at a still larger scale.

Referring now to the drawings, reference character 10 indicates the fuselage of a helicopter with tail end 11, front landing wheel 12 and lateral landing wheels 13. A motor 14 is mounted in the fuselage. In the illustrated embodiment, the motor is arranged with its axis parallel to the longitudinal axis of the craft, however, other arrangements can be had, e. g. with vertical motor axis, if so desired. The motor 14 is directly coupled with a blower 15 serving to provide the necessary cooling air. For this purpose several air channels 16 and 17 are provided which open into the atmosphere in the rear of a fire-proof bulkhead 18 between the pilot and passenger compartment 19 on the one hand and the drive compartment 20 on the other hand. The said channels 16 and 17 conduct the intake air from above and below the fuselage to the blower whereas the discharge air having cooled the motor leaves through a channel 21 which has an upward directed branch 22 and a downward branch 23 leading to the outlet ports 24 and 25 respectively. Means may be provided to direct the current of the discharge air either through the upper branch 22 or through the lower branch 23 or through both simultaneously. For this purpose, a flap 26 may be so hinged at 27 as to be adjustable in three positions indicated by the characters I, II, and III. It will be clear that with flaps 26 in the position I the entire air current is diverted toward the lower port 25, thus causing a reaction which tends to lift the tail end 11 of the fuselage 10. With the flap in position III, the current will be directed to the upper port 24 causing a reaction in the opposite sense; and with the flap in the position II, the reactions will be so balanced that the discharge of the air does not cause a torque about the transverse axis of the craft. Hence, the parts 21 to 27 may be used in order to influence the longitudinal position of the craft.

Motor 14 drives a rotor, in general denoted by reference character 28, via a train of transmission devices which now will be described. As clearly shown in Fig. 3, the motor 14 rests upon a portion of the fuselage framework or structure 29. One part 30 of a disconnectable clutch 31 is secured to the motor shaft 32 whereas the other clutch part 33 is in driving connection with an intermediate shaft 34. Shaft 34 is in turn splined to the one part 35 of a free-wheeling device or overrunning clutch 36 in a casing 37, and the other part 38 of the device 36 is secured to an end shaft 39 journaled in a bearing 40 which is mounted on the fuselage framework 29. Shaft 39 is in driving connection with a vertical shaft 41 via a set of bevel gears 42 and 43, and shaft 41 drives, in turn, a horizontal shaft 44 via bevel gears 45 and 46. Shaft 44 is journaled in bearings 47 and 48 mounted on framework 29. A bevel gear 49 is secured to shaft 44 and meshes with another bevel gear 50 which is mounted on a vertical shaft 51. This shaft 51 is rotatable interiorly of an also rotatable sleeve 52, for which purpose ball bearings 250 and 251 are provided as shown in Fig. 4. A sun and planet wheel drive 53 is intercalated between the parts 51 and 52. For this purpose a casing 54 (see Fig. 3) is mounted on the fuselage framework 29. Interiorly of this casing, a pinion 55 is secured to shaft 51, and an internal gear wheel 56 is fixed to sleeve 52. Planet wheels 56a journaled in casing 54 are in mesh with the pinion 55 and wheel 56.

Co-axially with shaft 51 and sleeve 52, a hollow shaft or rotor tower 57 is supported by a thrust bearing 59 which is carried by the fuselage framework 29. Shaft 51 bears with a head 51' (see Fig. 4) on the inner race of a ball bearing 252 arranged interiorly of the top end of the hollow shaft 57 and another ball bearing 253 at its lower end insures alignment of the shaft axes. In the illustrated embodiment the thrust bearing 59 comprises an upper race 60 which during flight is stationary and bears against a plate 61 and a ring 62 both being portions of the framework 29 whereas the lower race 63 bears on a lower shoulder or collar 64 integral with or secured to the tower 57. When the craft is standing still or the rotor rotating too slowly to carry its own weight, the lower race 63 is stationary and bears on the lower flange of an L-shaped ring 65 which is secured to the framework 29 by means of a supporting ring 66 and ribs 67. Then, the tower 57 will rest with an upper shoulder 68 on the upper race 60. It is advisable to provide means for preventing the transmission of vibrations from the drive to the motor and vice versa. For this purpose, sleeve 52 is connected to tower 57 by means of an elastic coupling 69 which, in the illustrated embodiment comprises, a cup-like member 70 secured to sleeve 52, and a disc 71 secured to tower 57. Member 70 and disc 71 are provided with alternating ribs 72 and 73 respectively, and the spaces between the ribs 72 and 73 are filled with an elastic material such as rubber not shown in order to avoid overcrowding of the drawings.

The transmission ratio between motor 14 and shaft or tower 57 is so selected that the rotor rotates with a suitable number of revolutions when the motor runs under full power. For instance, in a certain type of craft according to my invention, I have found a transmission ratio of 1:10 adequate where the rotor rotates with 225 R. P. M. when the motor runs with 2250 R. P. M. under full power. In each case, however, the correct transmission ratio will depend on the type of motor, the type and diameter of the rotor and other factors familiar to the expert.

As stated hereinbefore the invention contemplates the provision of a rotor with at least two pairs of blades with "feathering" control, which means that the angle of incidence of each blade can be progressively increased over 180° of its circle of rotation and subsequently progressively decreased over the remaining 130° of the circle while the angle of incidence of the opposite blade is simultaneously decreased and then increased at a similar rate. Although the invention will be described hereinafter with reference to a four-bladed rotor, the same principle is applicable also to a rotor having any desired or suitable number of pairs of blades. If now, according to the foregoing, in a four-bladed rotor one of the blades is in its position of maximum angle of incidence, the opposite blade is in its position of the minimum, whereas the two other blades are in their middle position so that the angles of incidence of these two other blades are equal. The decrease and increase of the angle of incidence starts for each of the four blades at that point of the mentioned circle which is selected by the pilot operating the controls described hereinafter. Now, I have found, that it is practically impossible to design a four-bladed propeller of more or less conventional type, which fulfills the requirements because the mechanism necessary to bring about the feathering would be so heavy and bulky if four blades are arranged in one plane that the construction would not be useful in an aircraft. According to my invention, I arrange, therefore, the blades in pairs, one above the other one, each pair consisting of the two blades located diametrically opposite each other. As stated hereinbefore, a rotor of this novel type must not be confused with two two-bladed rotors rotating coaxially but in opposite sense, and it is to be understood that my novel rotor with two pairs of blades in different planes is a uniform device owing to the fact that both pairs rotate in the same sense.

Figure 5:
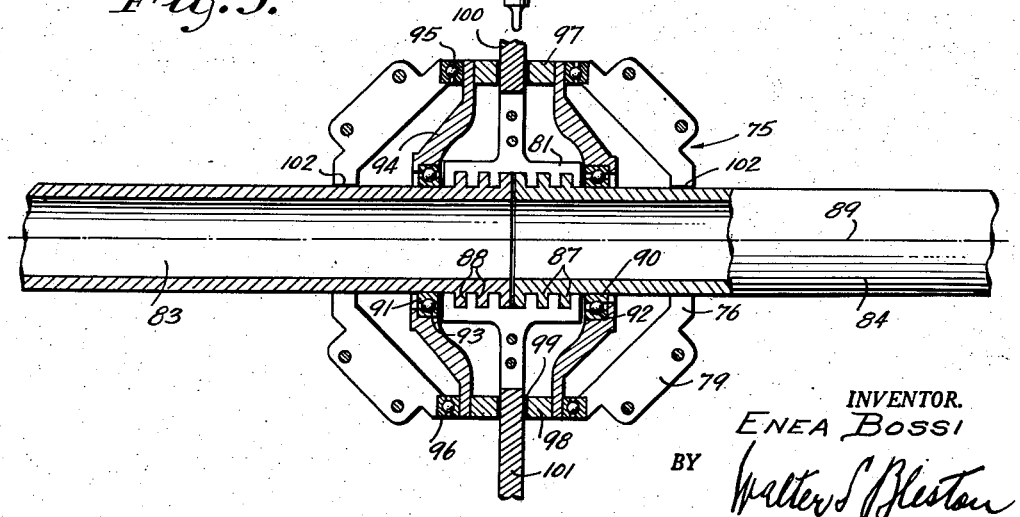
Fig. 5 is a section along line 5—5 of Fig. 4.

The problem of the mechanism of a four-bladed two-plane rotor with feathering control can be solved in various ways. In the illustrated embodiment of my invention, the hollow shaft or tower 57 is provided with a head or hub-like part 75 of substantially octagonal cross-section and parted in the horizontal center planes of the pairs of blades as clearly shown in Figs. 4 and 5. Thus, the head of the tower mainly consists of three parts, 76, 77 and 78. The lower part 76 is secured to the top end of the shaft 57 and the parts 76, 77 and 78 are fastened to each other by flange-and-screw connections as indicated at 79 and 80. Interiorly of the head 75 two sleeves 81 and 82 are arranged so as to oscillate each about a horizontal axis at right angles to the other one. Sleeve 81 serves to receive therein the roots of the two blades 83 and 84, whereas sleeve 82 contains the roots of the other pair of blades 85 and 86. Since the mountings of the two pairs of blades are substantially alike, only that of the pair 83 and 84 will be described hereinafter. In connection with my invention any suitable type of blades, i. e. with or without variable pitch may be used. I have shown blades of the invariable pitch type, with a plurality of flanges 87 at the roots in engagement with corresponding grooves 88 provided in the shell 81 in order to anchor the blades in the shell against the centrifugal force during rotation. However, it is to be understood that no relative rotation about the shell and blade axis 89 occurs between the blades and the shell when the apparatus is in operation, and when assembled the two blades 83 and 84 constitute one entirely. In a case like that of the illustrated embodiment in which no mechanism for varying the pitch of the blades individually is used, the roots of the blades may be also forged as one piece with the sleeve 81 which in that event need not take care of the centrifugal forces but serves only for the attachment of arms hereinafter described. On the blades, inside the shell 81, inner races 90 and 91 of two ball bearings are mounted. The outer races 92 and 93 of which being fixed in a hollow body 94. This body is journaled in another pair of ball bearings 95 and 96 provided in the head 75 so that body 94 can oscillate about a horizontal axis at right angles to axis 89. The ends of body 94 are closed by discs 97 and 98 each having elongated slot 99 through which arms 100 and 101 rigidly connected to shell 81 are passed. The corresponding arms of the upper blade assembly are denoted by 100' and 101'. Now it will be clear that the described mount of the blades constitutes a limited universal joint permitting the blades to be oscillated or rocked about axis 89 through an angle according to the length of the slots 99, and also about the axis of the bearings 95 and 96 through an angle according to the vertical extension of slots 102 in head 75 through which the blades project from the latter. Such oscillations are feasible notwithstanding the rotation of the assembly about the vertical axis of the rotor tower 57. I have found that it is sufficient in most cases, if the length of the slots permits oscillations through about 10° up and 10° down.

Figure 6:
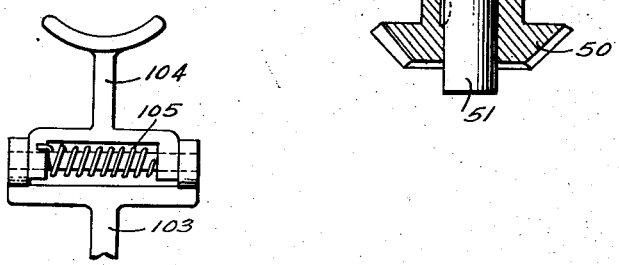
Fig. 6 is a front elevation of a part, in fact a blade support, of the device shown in Fig. 5.

Whereas, turning of the blades about axis 89 can only occur according to the pilot's operating the controls of the craft as explained hereinafter, oscillation about the axis of bearings 95 and 96 may automatically take place owing to prevailing external forces such as gusts of the wind. This may cause dangerous accidents, particularly if the craft is resting on the ground with the rotor standing still or rotating so slowly that the lifting power is insufficient to carry the machine. For that reason, I provide means to lock the blades in a horizontal position, i. e. in a plane at right angles to the tower axis until a predetermined rotor speed is reached. For that purpose, underneath each rotor blade a bracket 103 is attached to the tower head 75. A forked support 104 is journaled at the end of the bracket and a spring 105 is so arranged as clearly shown in Fig. 6 that it tends to hold the support in the upright position of Fig. 3 where it prevents the co-ordinate blade to swing downward from its horizontal position. The weight of the support 104 and the force of the spring 105 are so selected with respect to each other that the support will swing outward into horizontal position shown in dotted lines in Fig. 3 only if the rotor revolves with at least a predetermined speed. The brackets 103 may be also provided with an inclined surface 106 serving as an abutment for the blade so as to limit the oscillation about the axis of bearings 95 and 96 to a predetermined maximum.

Figure 7:
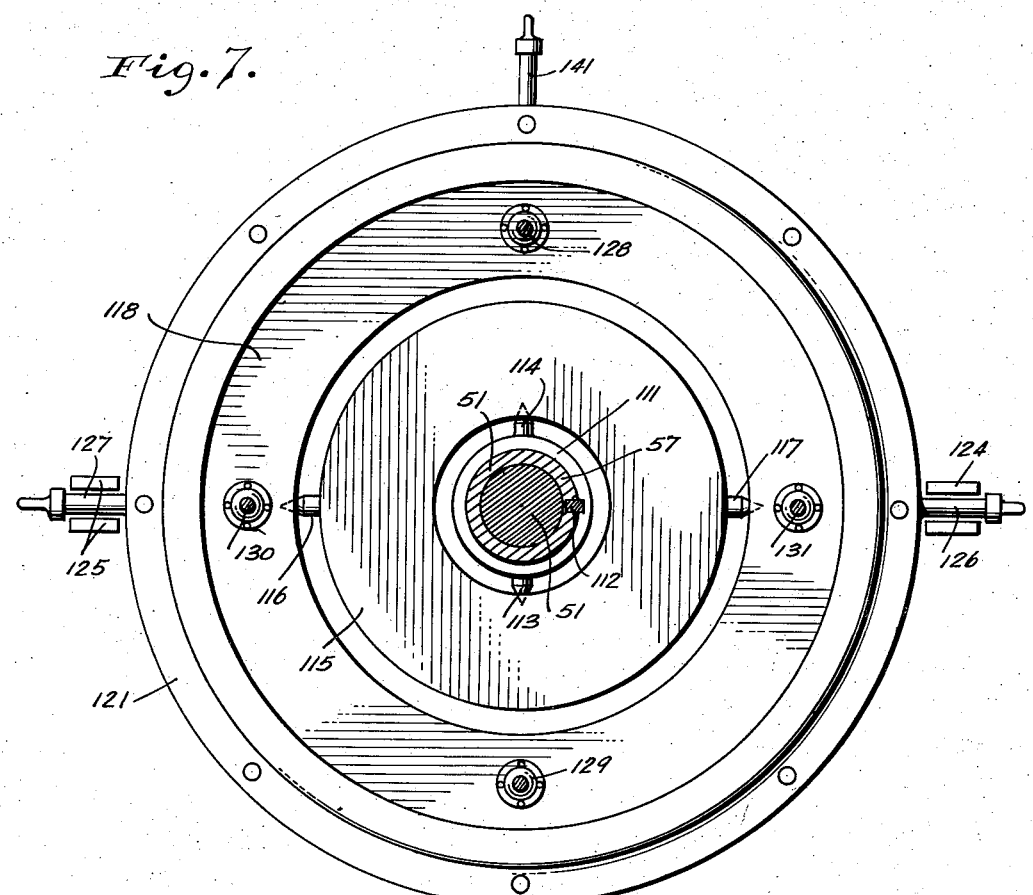
Fig. 7 is a cross-section along line 7—7 in Fig. 3.

Means are provided whereby the pilot is enabled to control the feathering of the blades, that means the adjustment of the rate of the increase and decrease of the angle of incidence of each blade during a revolution, and also the adjustment of that point of the rotor circle where the minimum is located, in order to control thereby the speed and direction in horizontal flight. For this purpose a control disc device is provided which is in general denoted by the character 110 and shown in detail in Figs. 4 and 7. The device 110 comprises a collar or sleeve 111 keyed at 112 to the rotor tower 57 and provided with two diametrically projecting pivots 113 and 114. In engagement with these pivots is a first gimbal ring 115 also provided with two pivots 116 and 117 diametrically projecting from its periphery, and so arranged that the axes of the pivots 116 and 117 are at right angles to those of the pivots 113 and 114. A second gimbal ring 118 engages pivots 116 and 117 and embodies near its periphery, the inner races of two ball bearings 119 and 120 whose outer races are formed by a channel-shaped ring 121 composed of two parts 122 and 123 so as to overlap the periphery of the gimbal ring 118. Two pairs of guiding elements 124 and 125 shown in Figs. 3 and 7 are in rigid connection with the fuselage framework 29, and radial projections 126 and 127 of the periphery of ring 121 engage between the guiding elements so that ring 121 can swivel about the axes of the pivots 113, 114 and 116, 117, but is prevented from rotating together with the tower 57. The guiding elements are preferably so arranged that the projections 126 and 127 can move up and down in the vertical longitudinal plane of the craft. At four equidistant points of its upper surface and on the same diameters as the mentioned pivots, gimbal ring 118 is provided with four ball bearing sockets 128, 129, 130 and 131 which are located vertically underneath the arms 100, 101, 100′ and 101′ respectively. Each of these arms are likewise provided at their ends with ball bearing sockets 132, 133, 134, 135 and ball-headed rods 136, 137, 138 and 139 are respectively connected to the sockets on ring 118 and those of the said arms. It will be noted that the rods 136 and 137 connecting arms 100 and 101 respectively to the sockets 128 and 129 are straight, whereas the rods 138 and 139 connecting arms 100′ and 101′ respectively to the sockets 130 and 131 are shaped as oval loops 140 through which the lower blades pass with freedom to swivel up and down. On a diameter at right angles to that on which the projections 126 and 127 are located, ring 121 is provided with two additional projections 141 and 142. The ends of the four projections 127, 126, 141 and 142 form eyelets for the attachment of control elements such as cables 143, 144, 145 and 146 respectively by means of which they are connected to the actuating means 142 (Figs. 2 and 10) in the pilot's compartment 19.

Now, it will be clear from Fig. 3 that if, for instance, cable 144 is pulled, ring 121 will tip with its front portion and, consequently, arm 101 will be pulled downward when in the position of Fig. 3 thereby turning the pair of blades 83 and 84 so that the angle of incidence of blade 83 will be decreased whereas that of the blade 84 will be increased. If now the rotor rotates the angle of incidence of blade 83 will increase to a maximum which is reached after 180° when rod 137 is in the illustrated position of rod 136 while the rear of ring 123 is tilted upward. During its movement through the subsequent 180°, the angle of incidence will be decreased to its original minimum. Similarly the blades 84, 85, and 86 will have a minimum angle of incidence when they are in the illustrated position of blade 83 and a maximum angle when they are in the diametrically opposite position. The difference in the angles of incidence of the opposite blades will cause a movement of the craft in a direction 90° forward of the direction of the minimum angle of incidence, that is to say forward with respect to the craft. Since, ring 121 owing to the gimbal arrangement can be tilted in any direction, the direction of the movement of the craft can be selected as desired.

Although any suitable control-actuating device 142 may be used in connection with my invention, I prefer a control stick 150 which can be reciprocated about a transverse horizontal axis so as to operate the cables 143 and 144, and a wheel 151 at the end of the control stick for operating the cables 145 and 146. I, furthermore, prefer to insert a transmission with a suitable ratio of, e. g. 1:10 in the connection between the control device 110 and the wheel 151.

Such transmission is diagrammatically indicated at 152 in Fig. 2. As control-actuating devices of the type mentioned hereinbefore are well known in the art no further description thereof will be necessary.

A gyro 159 may be provided and connected to the swash plate in order to increase the stability of the latter. In order to drive the gyro, the horizontal shaft 44 is extended to the rear beyond bearing 48 and journaled in an additional bearing 153. Between the two bearings, a bevel gear 154 is secured to the shaft 44 so as to mesh with another bevel gear 155 at the top end of a vertical shaft 156 rotatable in bearings 157 and 158 which are mounted on the framework 29 and a standard 158′ respectively. Shaft 156 drives the gyro 159 which, in principle, may be of a design similar to that of the control device 110.

Thus, in the embodiment shown in Figs. 3 and 8, a sleeve 160 secured to the shaft 156 is surrounded by two gimbal rings 161 and 162 connected to each other and to the sleeve 160 by two pairs of pivots 163 and 164 at right angles to each other and in a plane intersected by the axis of shaft 156. Ring 162 has a heavy rim 165 so as to act as the actual gyro, although of course, ring 161 contributes its weight to the rotating masses. The upper and lower faces of rim 165 constitute inner races of ball bearings, 166 and 167 whose outer races are formed by a ring 168 of channel-shaped cross-section. Ring 168 is similar to ring 121 of the control device 110 and is prevented from rotation together with shaft 156 by means of a guide 168′ engaging an eyelet projection 169. Additional eyelets 170, 171 and 172 are provided on the outer periphery of ring 168. The eyelets 169, 170, 171 and 172 are respectively co-ordinated to the eyelets of the projections 126, 127, 142 and 141, respectively, of the said ring 121 and connected to them by cables 174, 173, 176 and 175 or similar means as shown in Figs. 3 and 10. Hence, if the control device 110 is tilted by a manipulation of the control stick 150 or wheel 151, the gyro connected to that device will be forced into a position parallel to the latter and will tend to maintain the ring 118 in the adjusted position. It will be noticed that the gyro has a much higher R. P. M. than the rotor because of the planetary gear 53 located in the transmission line between the rotor and the gyro.

It has been stated that owing to the cable connection described hereinbefore, the gyro is compelled to rotate permanently in a plane parallel to that of the control ring 118 regardless in what direction the latter is tilted. Consequently, all forces acting on the one will act also on the other, and with both rotating in the same direction, the effect of the gyroscopic forces of the gyro will directly add to those of the control ring. In other words, the same result as with the gyro can be attained without the gyro if the inertia mass of the control ring is accordingly increased. The application of the gyro, however, is advantageous, because it renders it possible to save weight as the gyro may be designed and arranged to rotate with any desired high velocity, whereas the control ring in combination with the rotor must rotate with the R. P. M. of the latter.

In order to counteract the torque exercised by the rotor, a propeller 180 is mounted on the end of the tail 11 of the fuselage so as to rotate about a horizontal axis with its plane substantially co-inciding with the vertical longitudinal plane of the craft. This propeller is driven by an extension 181 of shaft 44, connected to the latter by means of a universal joint 182. An end shaft 183 is provided which transmits power from the extension 181 to propeller 180 by means of sets of bevel gears as shown at 184. From the foregoing description of the various parts of the drive it will be clear that propeller 180 will rotate always with a speed of constant ratio with respect to the rotor, so as to balance the torque of the latter no matter what the speed of the rotor is at any time. If propeller 180, as in the case of the present embodiment is of the type with adjustable pitch it may be used as a rudder. For this purpose control cables 185 are indicated in Fig. 2 whereby the propeller pitch may be varied by operating pedal 186 in a manner similar to that of a rudder in a conventional airplane.

In order to cushion the craft according to my invention the wheels are provided with hydraulic or pneumatic shock absorbers 190. In addition thereto the lateral wheels 13 are carried by arms 191 which are swingable about a longitudinal axis 192 as shown in Fig. 9, and provided with rubber cord dampeners 193 wound about the arms 191 and brackets 194 at the bottom of the fuselage.

The helicopter according to my invention operates in the following manner: When the motor 14 is started, blower 15 forces cooling air entering through ports 16 past the motor into the channel 21 from where it is expelled through ports 24 and 25 while flap 26 is in the position II. Then, clutch 31 may be engaged whereupon engine power is transmitted from the motor through the free wheeling device, shafts 39, 41, 44 and 51 to the sun wheel 55 of the planetary gear 53 so that sleeve 52 connected with gear wheel 56 rotates with reduced speed according to the transmission ratio of the device 53. The rotor tower 57 is taken along by the elastic coupling 69 with the same speed as sleeve 52, but dampened as to vibration originating from the power source and the various power-transmitting elements. The tower rotates the rotor 28 and also the brackets 103 with supports 104 and the control disc device 110 except for the outer ring 123 of the latter. Simultaneously, the gyro 165 is rotated via shafts 44 and 156, and so is the propeller 180, connected to shaft 44 by means of shafts 181 and 183. If the control-actuating member, i. e., control stick 150, wheel 151 and also pedal 186 are in their middle position at that time, all rotor blades will have the same angle of incidence, the control disc device 110 and gyro 165 will be in horizontal position, and the pitch of propeller 180 will be such that the torque of the rotor is substantially balanced. If, now, the motor speed will be increased the centrifugal force will automatically swing the blade supports 104 outward so that the blades are free to rock about a horizontal axis at right angles to the longitudinal blade axis. Further increase of the motor speed causes the craft to rise when the R. P. M. of the rotor is sufficient to develop the required lifting power. When the machine has reached the desired altitude the control stick may be pushed forward whereby the control ring 110 is tilted forward too with the result that the blades of the rotor are "feathered" so that the minimum angle of incidence occurs when a blade reaches the position in which it extends to the right or starboard side. The helicopter will react to the effect of the difference in the angle of incidence of the opposite blades of each pair by moving forward. Simultaneously with the tilting of the control ring the gyro 165 will be tilted owing to its cable connection with the control ring and will maintain its parallelism with the latter. Gusts or other unbalanced forces are counteracted by a rocking movement of the blades. If an outside force occurs, tending, e. g. to tilt the rotor backward, the latter will react owing to its precession by actually tilting downward on the starboard side if the direction of rotation, seen from the top, is clockwise. On account of the universal joint of each pair of blades, no immediate reaction on the control ring will occur, and the rotor will return to its original position when the former balance of forces is restored. If, however, owing to such outside force a tilting of the entire system, i. e. of the fuselage and the rotor shaft occurs, two possibilities must be considered regarding the control ring and the gyro. In this connection it will be sufficient to mention only the control ring, assuming that the latter comprises a more or less appreciably large inertia mass. The gyro will then act exactly in the same manner according to what has been stated above. Thus, when the system tilts, the control ring may either not be constrained by outside forces, that means the pilot may not counteract changes of the position of the control ring relatively to the fuselage, or the pilot may use the control elements in such a manner as to counteract such changes. In the first case the control ring will continue to maintain its plane of rotation in space, or a plane parallel thereto, and the feathering of the rotor will not be changed regardless of any tilting of the rotor plane. In the second case, if similarly to what has been assumed hereinbefore, the vertical axis of the craft is tilted backward by an outside force during the forward flight, and if then the pilot exercises a force to hold the control ring at the original angle in relation to the vertical axis of the craft, the control ring will tilt downward on the starboard side owing to its precession, provided of course that such precessional movement is not prevented by the pilot. In consequence, the minimum feathering angle of the blades will occur when the latter are in the rearward directed position, and according to the aerodynamic qualities of the conventional air foils of the blades of aircraft rotor which have, in general, an appreciably higher lift to drag ratio at feathering angles below than at angles above normal, the lift in the rear semi-circle of the rotor will exceed that in the front semi-circle. This will cause a force directly opposed to that which caused the original disturbance of the equilibrium. Thus, in both instances, the control ring considered as a rotating mass and also a gyro in the arrangement and connection illustrated and hereinbefore described, will have a stabilizing effect. In the one case, it insures the return to the original condition when the disturbing force has passed; in the other case, it responds to a natural reaction of the pilot to a disturbance in such a manner as to counteract the original disturbing force. In connection with the foregoing it will be noticed that precessional forces of the control ring and the gyro, similar to those mentioned hereinbefore, will occur whenever the pilot operates the controls in ordinary flight in order to change course. In other words, the pilot will have to overcome not only the precession of the control ring, but also that of the gyro when he wishes to tilt the control ring in a desired manner. However, in ordinary flight, control movements are and should be slow in general. and as the force of precession of a rotating inertia mass is a function of the acceleration of the tilting of its axis, the resistance to a normal actuation of the controls will be small notwithstanding the effect of the gyro. As stated hereinbefore the helicopter may move in any direction by tilting the control device accordingly. Since the propeller 180 is normally so set that it balances the rotor torque, the relative wind will turn the fuselage with its longitudinal axis substantially in the direction in which the rotor advances. If for any reason the torque is not correctly balanced, or if a position of the craft other than that in which longitudinal axis and heading coincide is desired, pedal 186 may be actuated in order to increase or decrease the propeller pitch. On the other hand if it is desired to effect or to eliminate an inclination of the longitudinal axis of the craft, adjustment of the flap 26 in the channel of the discharged cooling air will cause a reaction tending to cause a rising or lowering of the tail of the fuselage.

For the descent the motor speed will be reduced until the lifting power of the rotor is no more sufficient to carry the craft. Should for any reason the motor fail while the helicopter is in the air the free wheeling device 36 will permit the rotor to continue rotating under the action of the ascending relative wind, so that an admissible speed of the descending craft cannot be exceeded. Simultaneously, the rotor will drive the gyro and the propeller through the planetary gear and shaft 44 thereby insuring the required stability. Any landing shock will be absorbed by the damping devices 190 and 193 in connection with the wheels. As soon as the R. P. M. of the rotor falls below a predetermined minimum the supports 104 will be automatically moved into operative position so as to hold the rotor blades horizontally.

It will be understood that various changes in the specific form of helicopter and its parts may be made without departing from my invention which is not limited by the particular disclosure of the embodiment thereof illustrated and described hereinabove but by the scope of the appended claims.

I claim:

1. A helicopter rotor comprising blades, bearings on said rotor for said blades to permit rocking of the latter in a vertical plane, and means in connection with said rotor and responsive to centrifugal force for locking said blades in a substantially horizontal position when the angular velocity of the rotor falls below a predetermined minimum.

2. A helicopter rotor comprising a hub-like part, a plurality of pairs of diametrically connected blades, said pairs being arranged on different levels but rotatable in the same direction, means in connection with said hub-like part and said pairs of blades to permit the latter to rock in vertical planes, a bracket attached to said hub-like member underneath each of said blades, a supporting member linked to the end of each of said brackets, and a spring in connection with each bracket and associated supporting member so as to lift the latter against a predetermined centrifugal force into engagement with the co-ordinate blade whereby said supporting member will hold said blade in a substantially horizontal position.

3. A helicopter rotor comprising a hub-like part, a plurality of pairs of diametrically and rigidly connected blades supported by said hub-like part, said pairs of blades being arranged one above the other one and angularly staggered as to their longitudinal axes, each pair of blades being free to rock a limited angle in a vertical plane and to be turned about its longitudinal axis, a member rotatable with said hub-like part and mounted thereon so as to tilt about two axes at right angles to each other and intersecting on the rotor axis, controllable means to tilt said member and to hold it tilted during rotation with its lowest point in a selected radial position, and connections between said member and each of said pairs of blades, the points where said connections engage said member being angularly spaced according to the stagger of said pairs of blades to cause feathering of all pairs of blades in the same manner owing to the rotation of said member in an inclined plane.

4. A helicopter rotor as claimed in claim 3, with two pairs of blades, said member being arranged below the lower one of said pairs of blades, said connections between said member and said pairs of blades comprising radial arms of said pairs of blades, said arms extending at right angles to the longitudinal axes of the associated blades, and substantially vertical connecting rods linked to the free ends of said arms and to said member, the rod in connection with the arm of the upper pair of blades being curved intermediate its ends so as to prevent interference with the rocking movement of the lower pair of blades.

5. In a rotary wing aircraft, a rotor comprising a hub structure, a plurality of pairs of blades diametrically and rigidly connected for common movement, said pairs of blades being arranged in different planes one above the other and angularly staggered and being rotatable in the same direction, a first pair of bearings for each pair of blades, the axis of said bearings coinciding with the longitudinal axis of said pair of blades so as to permit feathering thereof, a second pair of bearings for each pair of blades and having an axis intersecting the axis of the coordinate first bearings at right angles in a point of the axis of said rotor, said second bearings being supported by said hub structure and so arranged and constructed as to support said first bearings, means to limit rocking of each pair of blades about the axis of said second bearings, and a common means to control the feathering movement of all blades about the axes of the first bearings respectively.

6. In a rotary wing aircraft, a rotor comprising a hub structure, a plurality of pairs of blades diametrically and rigidly connected for common movement, said pairs of blades being arranged in different planes one above the other and angularly staggered and being rotatable in the same direction, a first pair of bearings for each pair of blades, the axis of said bearings coinciding with the longitudinal axis of said pair of blades so as to permit feathering thereof, a second pair of bearings for each pair of blades and having an axis intersecting the axis of the coordinate first bearings at right angles in a point of the axis of said rotor, said second bearings being supported by said hub structure and so arranged and constructed as to support the coordinate first bearings, means to limit rocking of each pair of blades about the axis of the coordinate second bearings, an adjustable control member, and a connecting means between said control member and each pair of blades, said connecting means being independent from each other and responsive to the adjusted position of said member to cause feathering of all the blades in substantially the same manner regardless of their rocking positions but with a phase shift as to the individual blades according to the angle a blade lags behind another one during the rotation of the rotor.

7. In a rotary wing aircraft, a rotor comprising a hollow hub structure, a plurality of pairs of diametrically and rigidly connected blades, a shell member for each pair of blades interiorly of said hub structure, a pair of first bearings for each shell member and supported by said hub structure, said pairs of bearings being arranged one above the other and angularly spaced from each other, each shell member including second bearing means to support the coordinate pair of blades for oscillatory movement about its longitudinal axis, the wall of said hub structure being provided with slots through which said blades are passed so as to permit said pairs of blades to rock about said axes of said pairs of first bearings respectively, and said rotor further comprising an arm for each of said pairs of blades and rigidly connected therewith, said arms passing each through an opening in one of the coordinate pair of first bearings and being adapted to be reciprocated through a limited angle about the longitudinal axis of the associated pair of blades.

8. In a rotary wing aircraft, a rotor comprising a hollow hub structure, a plurality of pairs of blades diametrically arranged and rigidly connected for common movement, said pairs of blades being arranged in different planes one above the other and angularly staggered and being rotatable in the same direction, a joint member for each pair of blades, each joint member including a pair of bearings mounted in said hub structure, the axis of said bearings intersecting the rotor axis at right angles, said hub structure being composed of a plurality of releasably connected sections, said sections being fitted together in planes which are at right angles to the rotor axis and include said bearing axes respectively.

ENEA BOSSI.